(12) United States Patent
Smith et al.

(10) Patent No.: US 11,541,793 B2
(45) Date of Patent: Jan. 3, 2023

(54) FOLD DOWN SEAT CONTROL

(71) Applicant: GM GLOBAL TECHNOLOGY OPERATIONS LLC, Detroit, MI (US)

(72) Inventors: Anthony L. Smith, Troy, MI (US); Vipin Kapoor, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 9 days.

(21) Appl. No.: 17/143,283

(22) Filed: Jan. 7, 2021

(65) Prior Publication Data

US 2022/0212584 A1 Jul. 7, 2022

(51) Int. Cl.
*B60N 2/835* (2018.01)
*B60N 2/30* (2006.01)
*B60N 2/815* (2018.01)

(52) U.S. Cl.
CPC ............ *B60N 2/835* (2018.02); *B60N 2/3011* (2013.01); *B60N 2/815* (2018.02)

(58) Field of Classification Search
CPC ...... B60N 2/856; B60N 2/874; B60N 2/3011; B60N 2/835; B60N 2/815
USPC .............................................. 297/408, 378.1
See application file for complete search history.

(56) References Cited

U.S. PATENT DOCUMENTS

| | | | | |
|---|---|---|---|---|
| 5,590,933 A | * | 1/1997 | Andersson | B60N 2/874 297/403 |
| 5,681,079 A | * | 10/1997 | Robinson | B60N 2/36 297/378.12 |
| 6,192,565 B1 | * | 2/2001 | Tame | B60N 2/874 297/410 |
| 7,258,400 B2 | * | 8/2007 | Yamada | B60N 2/3011 297/378.12 |
| 8,197,001 B2 | * | 6/2012 | Grable | B60N 2/859 297/378.1 |
| 2005/0168038 A1 | * | 8/2005 | Kubo | B60N 2/835 297/410 |
| 2005/0179301 A1 | * | 8/2005 | Clark | B60N 2/3011 297/403 |

\* cited by examiner

*Primary Examiner* — Sarah B McPartlin
(74) *Attorney, Agent, or Firm* — Harness, Dickey & Pierce, P.L.C.

(57) ABSTRACT

A vehicle includes a passenger compartment having a first row of seats and a second row of seats disposed behind the first row of seats. The second row of seats including a seat back configured to fold forward toward the first row of seats. The seat back of the second row of seats further including at least one headrest that is movable from a retracted position to an extended position. The at least one headrest includes a retraction mechanism configured to retract the headrest to a retracted position automatically when the seat back of the second row of seats is folded forward.

19 Claims, 3 Drawing Sheets

FOLD DOWN SEAT CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to fold-down vehicle seats that have a headrest. Currently, middle and rear seating rows in a vehicle can include a headrest that can inhibit the complete fold down of the seat back if the headrest is not in the fully retracted position.

SUMMARY

Further areas of applicability of the present disclosure will become apparent from the detailed description, the claims and the drawings. The detailed description and specific examples are intended for purposes of illustration only and are not intended to limit the scope of the disclosure.

A vehicle includes a passenger compartment having a first row of seats and a second row of seats disposed behind the first row of seats. The second row of seats including a seat back configured to fold forward toward the first row of seats. The seat back of the second row of seats further including at least one headrest that is movable from a retracted position to an extended position. The at least one headrest includes a retraction mechanism configured to retract the headrest to a retracted position automatically when the seat back of the second row of seats is folded forward.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
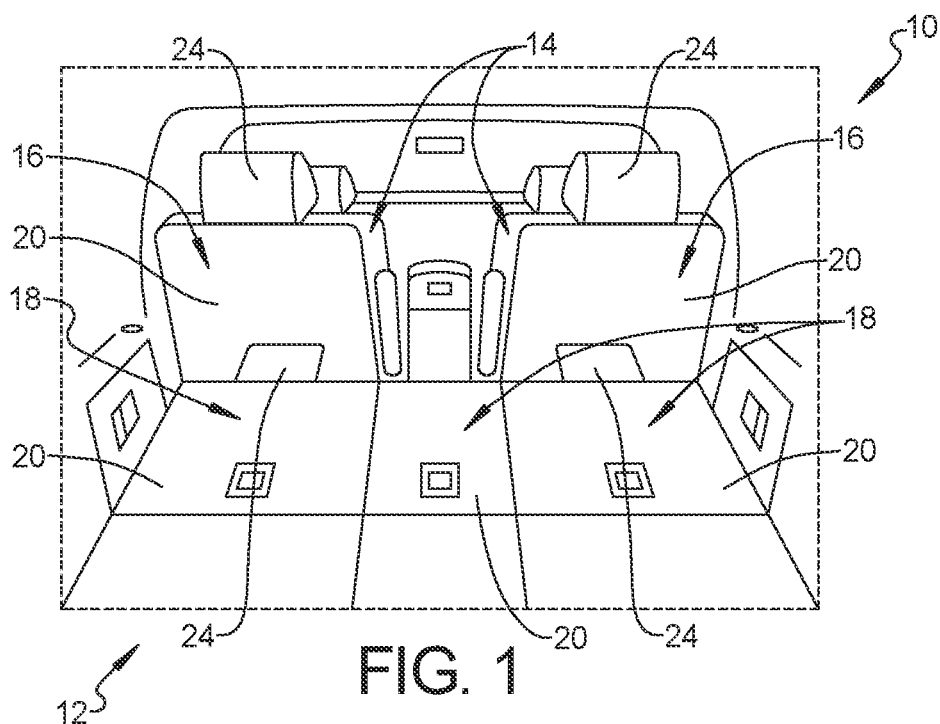
FIG. 1 is a perspective view of a vehicle having a passenger compartment with multiple rows of seats.

With reference to FIG. 1, a vehicle 10 is shown having a passenger compartment 12 having a front row of seats 14, a middle row of seats 16 and a rear row of seats 18. For purposes of this disclosure, the fold-down seat control of the present disclosure can apply to the middle row of seats 16 and/or the rear row of seats 18. In particular, the middle row of seats 16 and the rear row of seats 18 can each include a seat back 20, a seat bottom 22 (See FIG. 3) and a retractable headrest 24. In each of the middle row of seats 16 and the rear row of seats 18, the seat back 20 is foldable forward relative to the seat bottom 22. If the headrest of the middle row of seats 16 and the rear row of seats 18 is in an extended position, it could hit the row of seats in front of it and interfere with the seat back 20 reaching its fully folded position. Accordingly, the present disclosure provides a retraction mechanism 26, 126, 226 (See FIGS. 2, 4, 6) configured to automatically retract the headrest 24 to a retracted position when the seat back 20 of either the middle or rear row of seats 16, 18 is folded forward.

Figure 2:
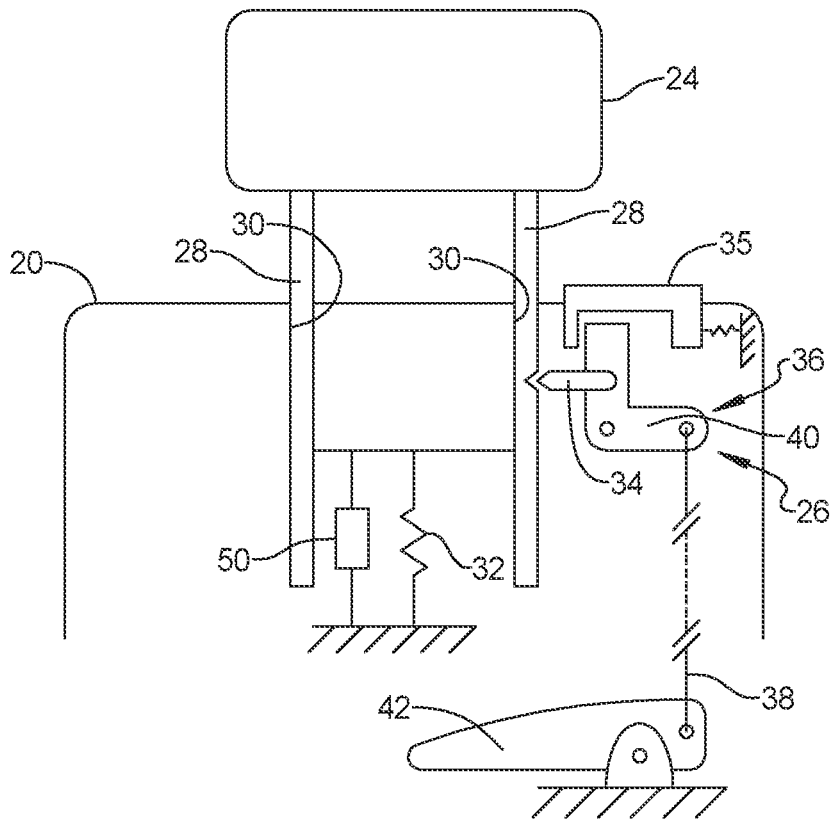
FIG. 2 is a front schematic view of a first embodiment of a fold down seat having a retractable headrest according to the principles of the present disclosure.
Figure 3:
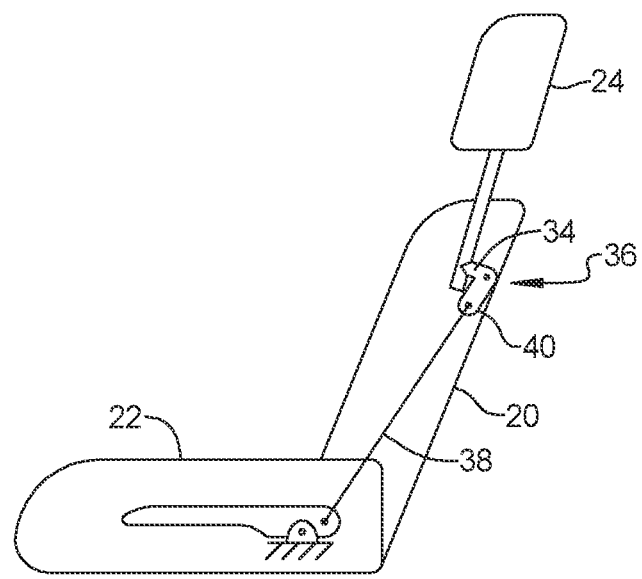
FIG. 3. is a side schematic view of the fold down seat of FIG. 2.
Figure 4:
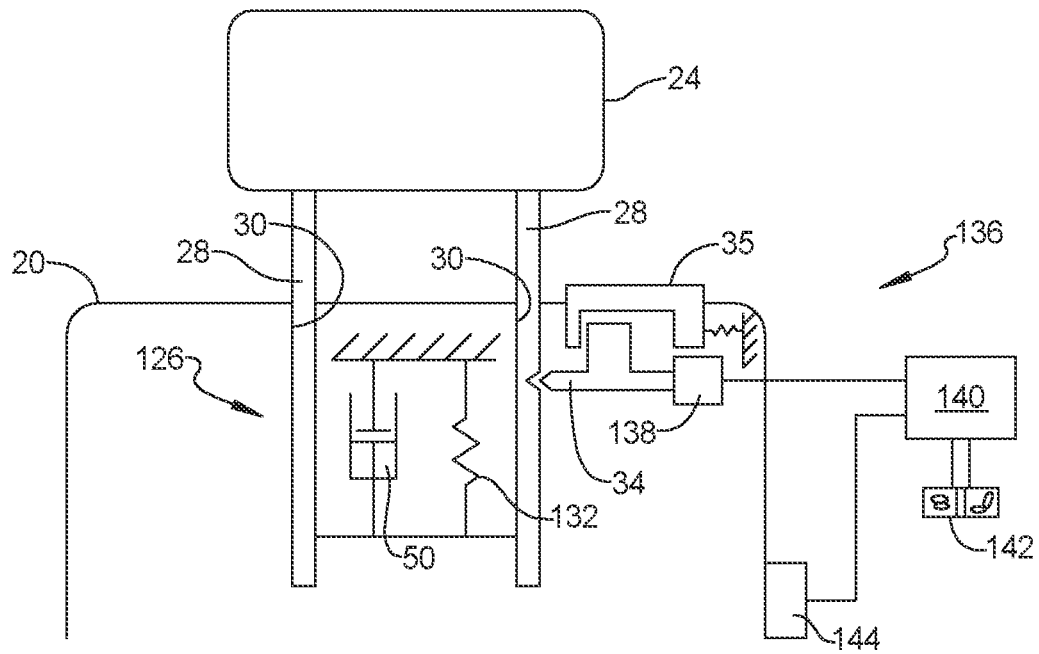
FIG. 4 is a front schematic view of a second embodiment of a fold down seat having a retractable headrest according to the principles of the present disclosure.

With reference to FIGS. 2 and 3, the seat back 20 is shown with a retraction mechanism 26 for retracting a headrest 24 that is supported by a pair of rods 28 that are inserted in apertures 30 in the seat back 20. The retraction mechanism 26 includes a spring 32 connected to the headrest 24. When the headrest 24 is moved to the extended position, the spring 32 can be configured to be loaded in tension, as shown in the embodiment of FIG. 2 or the spring 132 can be configured to be loaded in compression, as shown in the embodiment of FIG. 4. When the spring 32, 132 is loaded, either in compression or tension, based upon its configuration, the spring 32, 132 biases the headrest toward the retracted position. A detent mechanism 34 is provided for releasably holding the headrest 24 in the extended position. The detent mechanism 34 can releasably engage a recess or one of a series of recesses disposed in one of the pair of rods 28. The detent mechanism 34 can be in communication with a hand releasable mechanism 35 such as a slide or lever that is employed with a headrest 24 to manually release the detent mechanism 34. The seat 16, 18 can further include a detent release mechanism 36 that interacts with the detent mechanism 34 to release the detent mechanism 34 when the seat back 20 is folded forward. With reference to FIGS. 2 and 3, the detent release mechanism 36 can include a cable 38 and/or lever 40 (or other mechanism) that can be interconnected to a seat dump lever 42 that is well known in the art for activating a seat tilt mechanism for pivoting the seat back 20 forward. The lever 40 can be biased by a spring toward an engaged position. Accordingly, when the seat dump lever 42 is activated for pivoting the seal back 20 forward, the detent mechanism 34 is automatically released by the detent release mechanism 36 to allow the spring 32 to bias the headrest 24 to its retracted position while the seat back 20 is pivoted forward so that the headrest 24 does not interfere with allowing the seat back 20 to fold fully forward.

Figure 5:
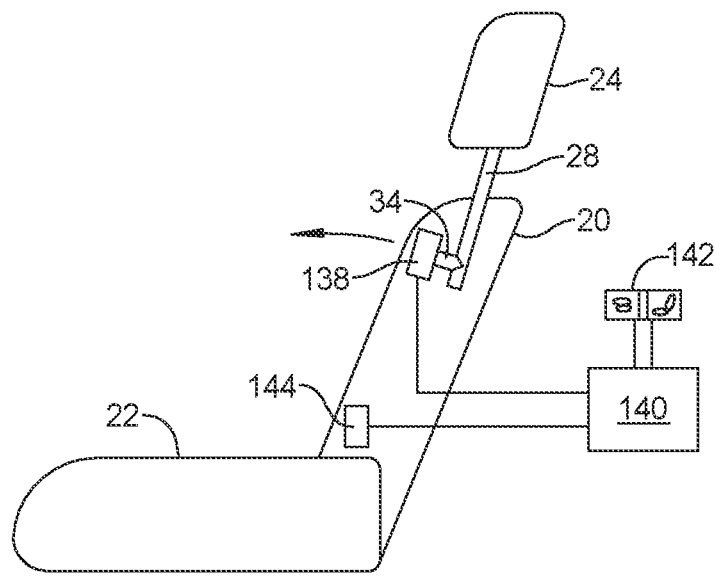
FIG. 5. is a side schematic view of the fold down seat of FIG. 4.

With reference to FIGS. 4 and 5, an alternative embodiment is shown in which the spring 132 is configured to be in compression when the headrest 24 is in the extended position. In addition, the detent mechanism 34 is engaged by a detent release mechanism 136 that includes a solenoid 138. The solenoid 138 can be electronically activated by a controller 140 in response to the activation of a seat fold-down switch 142 which also activates a seat fold-down motor 144 that electronically controls the position of the seat back 20. Accordingly, when a user presses the fold-down switch 142 to cause the seat fold-down motor 144 to fold the seat back 20 forward, the controller 140 also activates the solenoid 138 to release the detent mechanism 34 so that the spring 132 can bias the headrest 24 to the retracted position. Therefore, an extended headrest 24 is automatically retracted, so that the headrest 24 does not inhibit the movement of the seat back 20 to the fully folded position.

Figure 6:
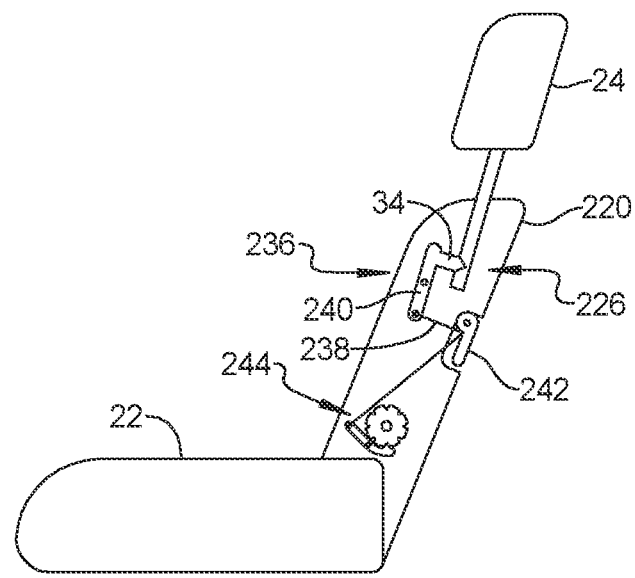
FIG. 6 is a side schematic view of a third embodiment of a fold down seat having a retractable headrest according to the principles of the present disclosure.

With reference to FIG. 6, another alternative embodiment is shown where the seat dump lever 242 is incorporated in the back of the seat back 220 so that it would be accessible to a user from the rear of the passenger compartment. As shown in FIG. 6, the seat dump lever 242 can be connected to a seat back release mechanism 244 that allows the seat back 220 to fold forward. In addition, the seat dump lever 242 can be connected to a detent release mechanism 236 that interacts with the detent 34 to release the detent mechanism 34 when the seat back 220 is folded forward. With reference to FIG. 6, the detent release mechanism 236 can include a cable 238 and/or lever 240 that can be interconnected to the seat dump lever 242. Accordingly, when the seat dump lever 242 is activated for pivoting the seal back 220 forward, the detent mechanism 34 is automatically released by the detent release mechanism 236 to allow the spring 32 (such as is provided in the earlier embodiments) to bias the headrest 24 to its retracted position while the seat back 220 is pivoted forward so that the headrest 24 does not interfere with allowing the seat back 220 to fold fully forward.

Optionally, a damper 50 can be in parallel with the spring 32, 132 to provide a smoother motion of the headrest 24 to prevent banging. The damping can be designed such that the headrest 24 can be fully retracted in time for the seat back 20 to fold completely down without interference from forward row of seats. The detent 34 can also be manually disengaged by the user so that the headrest 24 can be manually retracted as well.

According to the present disclosure, the release of an extended headrest can be accomplished through a mechanical or an electrical apparatus in order to automatically retract the headrest when a seat back is being folded forward. It should be understood that although the disclosure of the present application is described in connection with an automotive vehicle seating system, the disclosure can also be applicable to other non-automotive seating systems.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A vehicle comprising:
a passenger compartment having a first row of seats and a second row of seats disposed behind the first row of seats, the second row of seats including a seat back configured to fold forward toward the first row of seats;
the seat back of the second row of seats further including at least one headrest that is supported by at least one rod that is inserted in an aperture in the seat back and the at least one headrest being movable from a retracted position disposed immediately adjacent to a top surface of the seat back to an extended position spaced from the top surface of the top surface of the seat back, wherein the at least one headrest includes a retraction mechanism configured to retract the headrest to the retracted position automatically when the seat back of the second row of seats is folded forward, wherein the retraction mechanism includes a spring connected to the head rest to bias the headrest toward a retracted position and a detent mechanism configured to hold the head rest in the extended position and is released when the seat back is folded forward in order to move the head rest to the retracted position.

2. The vehicle according to claim 1, wherein the detent mechanism is released by a solenoid that is activated in response to activation of a motor driven folding mechanism of the seat back of the second row of seats.

3. The vehicle according to claim 2, wherein the motor driven folding mechanism is in communication with an activation switch that is operable by a user.

4. The vehicle according to claim 1, wherein the detent mechanism is released by a mechanical linkage configured to release the detent mechanism when the seat back is pivoted forward.

5. The vehicle according to claim 4, wherein the mechanical linkage is connected to a seat tilt device.

6. The vehicle according to claim 1, further comprising a headrest release latch adjacent to the head rest and configured to be operated by a user to disengage the detent mechanism.

7. The vehicle according to claim 1, wherein the first row of seats is a front row of seats.

8. The vehicle according to claim 1, wherein the first row of seats is a middle row of seats and the second row of seats is a rear row of seats.

9. A vehicle comprising:
a passenger compartment having a first row of seats and a second row of seats disposed behind the first row of seats, the second row of seats including a seat back configured to fold forward toward the first row of seats;
the seat back of the second row of seats further including at least one headrest that is supported by at least one rod that is inserted in an aperture in the seat back and the at least one headrest being movable from a retracted position disposed immediately adjacent to a top surface of the seat back to an extended position spaced from the top surface of the top surface of the seat back, wherein the at least one headrest includes a retraction mechanism configured to retract the headrest to the retracted position automatically when the seat back of the second row of seats is folded forward, wherein the retraction mechanism includes a spring connected to the head rest to bias the headrest toward a retracted position and a detent mechanism configured to hold the head rest in the extended position and the detent mechanism is configured to be released when the headrest is pivoted to allow the spring to bias the head rest to the retracted position.

10. The vehicle according to claim 9, wherein the spring is compressed when the headrest is in the extended position.

11. A vehicle comprising:
a passenger compartment having a first row of seats and a second row of seats disposed behind the first row of seats, the second row of seats including a seat back configured to fold forward toward the first row of seats;
the seat back of the second row of seats further including at least one headrest that is supported by at least one rod that is inserted in an aperture in the seat back and the at least one headrest being movable from a retracted position disposed immediately adjacent to a top surface of the seat back to an extended position spaced from the top surface of the top surface of the seat back, wherein the at least one headrest includes a spring configured to bias the headrest toward the retracted position and a detent mechanism configured to hold the head rest in the extended position and is released when the seat back is folded forward in order to move the head rest to the retracted position.

12. The vehicle according to claim 11, wherein the detent is released by a solenoid that is activated in response to one of a mechanical or electrical folding of the seat back of the second row of seats.

13. The vehicle according to claim 11, wherein the detent is released by a mechanical linkage configured to release the detent mechanism when the seat back is pivoted forward.

14. The vehicle according to claim 11, wherein the first row of seats is a front row of seats.

15. The vehicle according to claim 11, wherein the first row of seats is a middle row of seats and the second row of seats is a rear row of seats.

16. The vehicle according to claim 11, further comprising a headrest release latch configured to be operated by a user to disengage the detent.

17. A vehicle comprising:
a passenger compartment having a first row of seats and a second row of seats disposed behind the first row of seats, the second row of seats including a seat back configured to fold forward toward the first row of seats;
the seat back of the second row of seats further including at least one headrest that is supported by at least one rod that is inserted in an aperture in the seat back and the at least one headrest being movable from a retracted position disposed immediately adjacent to a top surface of the seat back to an extended position spaced from the top surface of the top surface of the seat back, wherein the at least one headrest includes a spring connected to the head rest to bias the headrest toward the retracted position and a detent mechanism configured to hold the head rest in the extended position and is released when the seat back is folded forward in order to move the head rest to the retracted position; and
a headrest release latch configured to be manually operated by a user to disengage the detent mechanism.

18. The vehicle according to claim 17, wherein the detent mechanism is released by a solenoid that is activated in response to activation of a motor driven folding mechanism of the seat back of the second row of seats, wherein the motor driven folding mechanism is in communication with an activation switch that is operable by a user.

19. The vehicle according to claim 17, wherein the detent mechanism is released by a mechanical linkage configured to release the detent mechanism when the seat back is pivoted forward.

* * * * *